3,296,313
NITROHYDROXYETHERS
John A. Frump, Terre Haute, Ind., assignor to Commercial Solvents Corporation, a corporation of Maryland
No Drawing. Filed Aug. 15, 1963, Ser. No. 302,470
2 Claims. (Cl. 260—615)

This application is a continuation-in-part of copending application Serial No. 8,234, filed February 12, 1960, now abandoned.

My invention relates to a new group of nitrogen compounds and a process for their preparation. More particularly, it relates to a catalytic process for oxyalkylating nitroalcohols and nitropolyols with epoxides and the novel nitro and amino hydroxyethers obtained thereby.

The novel nitrohydroxyethers, compounds A, of the invention are those having the following general formula:

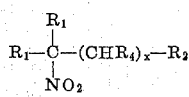

wherein $R_4$ is a member selected from the group consisting of methyl and hydrogen; wherein $R_1$ is a member selected from the group consisting of alkyl radicals, for instance of about 1 to 10 or 20 carbon atoms including lower alkyl radicals; lower hydroxyalkyl radicals, for instance of up to 5 carbon atoms; and a radical having the general formula:

$$-(CH_2)_x-R_2$$

wherein $R_2$ in the above formula and radical is a member selected from the group consisting of the radicals (a) 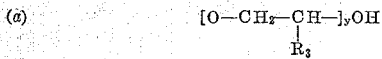

and (b) 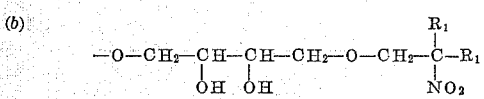

wherein $R_3$ is a member selected from the group consisting of hydrogen, phenyl, nitro-substituted phenyl, halo-substituted phenyl, alkyl, hydroxyl-substituted alkyl, halo-substituted alkyl, alkene, and phenyl-substituted alkyl radicals; $y$ is an integer ranging from about 1 to 10 or 20, and $x$ in the above formula and radical is an integer ranging from about 1 to 20.

The novel nitro compounds of my invention can be prepared by contacting an epoxide with a nitroalcohol having the formula:

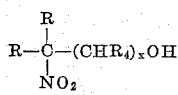

wherein $R_4$ has the above meaning and wherein R is a member selected from the group consisting of alkyl radicals of 1 to 20 carbon atoms, for instance including lower alkyl radicals; and lower hydroxy alkyl radicals, for instance having from about 1 to 5 carbon atoms; and $x$ is an integer ranging from about 1 to 20, in the presence of catalytic amounts of boron trifluoride or p-xylenesulfonic acid. Examples of suitable nitroalcohols are 2-nitro-2-methyl-1-propanol, 3-nitro-3-methyl-2-butanol, tris(hydroxymethyl)nitromethane, 2 - nitro - 2 - propyl - 1 - propanol, 2-nitro-2-methyl-1-octanol, 2-nitro-2-propyl-1-tridecanol, 2 - nitro - 2 - ethyl - 1 - nonadecanol, 12 - nitro-12 - methyl - 1 - tridecanol, 18 - nitro - 18 - methyl - 1 - nonadecanol, 6 - nitro - 6 -ethyl - 1 - heptanol, tris(hydroxyethyl)nitromethane, tris (hydroxybutyl)nitromethane, and the like.

In the process for producing my new nitro compounds, I generally employ temperatures ranging from about 0° C. to about 150° C. At temperatures above 150° C. decomposition of the new compounds may occur. Temperatures below 0° C., even though allowing formation of my new compounds, would not be economically practical due to the requirement for expensive cooling equipment. While a broad temperature range of from about 25° C. to about 150° C., for instance, is suitable for my process, I prefer to use temperatures ranging from about 50° C. or 90° C. to about 130° C. When temperatures below the melting points of the nitroalcohols used in my invention are utilized, I prefer to use a solvent for the nitroalcohol which solvent is inert to the reactants and the reaction product. Examples of solvents which are useful include isopropyl ether, chloroform, dioxane, and the like.

Satisfactory results can be obtained in my process for producing the novel compounds of my invention by using small or catalytic amounts of boron trifluoride or p-xylenesulfonic acid catalyst in the reaction mixture. It was surprising to discover these catalysts since other acidic catalysts were found to be unsatisfactory. Catalytic amounts of boron trifluoride or p-xylenesulfonic acid ranging from about 0.05 to about 0.5% or 5% based on the weight of the nitro alcohol can generally be utilized but boron trifluoride is preferred. However, if desired, more or less than this amount can be used. In utilizing the boron trifluoride catalyst in my process, I prefer to form a complex with a compound inert to the reactants and the reaction products, for example, an ether. Representative ethers which I have found to be useful in forming complexes with boron trifluoride include isopropyl ether, dimethyl ether, diethyl ether, dibutyl ether and the like. I prefer a complex of boron trifluoride-diethyl ether containing about 45 to about 50% by weight of boron trifluoride based on the weight of the complex. Although free boron trifluoride is a suitable catalyst in my process, its complexes with the ethers aforenamed are much easier to handle, use and store under ordinary industrial conditions, thus making them preferable to free boron trifluoride.

The molecular proportions used in producing the new compounds of my invention can vary considerably depending on the nitroalcohol and epoxide used and/or on the final product desired. Ordinarily, mole ratios of nitroalcohol to epoxide of not less than 1:1 and not more than about 1:10 or 1:20 are useful in my process.

The epoxides from which I prepare my compounds must contain at least one

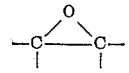

grouping. Representative epoxides include alkylene oxides such as ethylene oxide, butene-1-oxide, isobutylene oxide, butadiene monoxide, 1,2-epoxyoctane, 1,2-epoxytetradecane, 3,4-epoxy-1-butanol, 1,2-epoxynonadecane, etc.; alkylene dioxides such as butadiene dioxide, etc.; halo-substituted alkylene oxides such as chloropropylene oxide, bromo propylene oxide, etc.; phenyl-substituted alkylene oxides such as 1,2-epoxyethylbenzene, 1,2-epoxyoctylbenzene, 1,2-epoxyheptadecylbenzene, etc.; nitro-substituted phenyl-substituted alkylene oxides such as 1, 2-epoxyethylnitrobenzene, etc.: halo-substituted phenyl-substituted alkylene oxides such as 1,2-epoxy chlorobenzene, styrene oxide, and the like.

The novel nitro compounds of my invention can be reduced by any suitable reducing procedure to the corresponding amines. Thus, the method of the invention provides a novel and efficient means for obtaining novel amino hydroxyethers, compounds B, having the general formula:

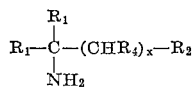

wherein $R_4$, $R_1$, $x$ and $R_2$ have the values assigned to them above. It should be noted that my attempts to obtain these amino hydroxyethers by oxyalkylation of the corresponding amino-alcohols proved unsuccessful since the oxylating agents were found to preferentially add onto the amino group rather than the hydroxyl group. This preferential addition is expected since the amino group is more reactive than the hydroxyl group and it was thus surprising to find that the novel amine compounds of the present invention could be produced by oxyalkylating the novel nitro compounds to the corresponding novel amine compounds of the present invention.

In another aspect, the method of my invention affords the production of a novel group of aminohydroxyethers having the structural formula that corresponds to that of the novel amino compounds given above for compounds B with the proviso that only one of the $R_1$'s in the formula is an alkyl group and $R_2$ is the radical $$[O-CH_2-\underset{R_3}{CH}-]_yOH$$

wherein $R_3$ and $y$ have the same values assigned above. In other words, the novel subgroup of aminohydroxyethers of the invention can be basically classified into three groups: (I)

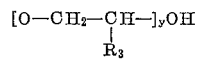

wherein $R_1$ in each case in an alkyl group of up to 20 carbon atoms and $R_4$, $R_2$ and $x$ have the values assigned above; (II) the same formula wherein only one of the $R_1$ is an alkyl group and the other is lower hydroxyalkyl, and $R_2$ is the radical

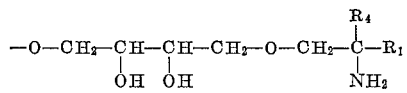

wherein $R_1$ has the value assigned above; and (III) the same formula as above wherein one $R_1$ is alkyl, the other is hydroxyalkyl and $R_2$ is the radical $$[O-CH_2-\underset{R_3}{CH}-]_yOH$$

where $R_3$ and $y$ have the same values assigned above.

The preparation of the aminohydroxy ethers of (I) is effected by oxyalkylating the corresponding dialkyl nitro alcohols with any of the oxyalkylating agents described above in molar ratios also described above, followed by reduction of the nitro group of the resulting nitro hydroxy ether to the amino group. The amino hydroxyethers of (II) on the other hand can be prepared by oxyalkylating the monoalkyl amino-alcohols with butadiene dioxide in a mole ratio of alcohol to butadiene dioxide of 2:1 and reducing the two nitro groups of the resulting nitro compound to amine groups. The amino hydroxy ethers of (III) can be similarly prepared using an hydroxyalkyl, alkyl, nitroalkanol.

In carrying out the reduction step, I prefer to first neutralize any remaining catalyst with a base, such as calcium hydroxide, and then dissolve the nitro compound in methanol and hydrogenate it under hydrogenation conditions, for instance at temperatures ranging from about 25° C. to 100° C. and at a pressure of from about 400 to 500 p.s.i. in the presence of catalytic amounts of a nitro to amine reducing agent, e.g. a nickel catalyst such as Raney nickel catalyst. After the reduction has taken place, the amine can then be purified by any suitable means, such as distillation.

The new nitrogen, i.e. nitro and amino, hydroxyether compounds of the invention are useful as corrosion inhibitors, bactericides, pigment wetting and dispersing agents, emulsifiers and as intermediates in the preparation of nonionic surface active agents. For example, in utilizing either the nitro or amino hydroxyethers as pigment wetting agents in a pigment system, I can add from about 2% to 8% by weight based on the weight of the pigment system of the compounds to a pigment system containing a pigment, such as titanium dioxide and water. The compounds thus act as wetting and dispersing agents for the pigment.

The following examples are offered to illustrate my invention; however, I do not intend to be limited to the specific materials, preparations and procedures shown. Rather, I intend for all equivalents obvious to those skilled in the art to be included within the scope of my invention.

*Example I*

To a closed reactor equipped with an agitator containing 1071 grams of 2-nitro-2-methyl-1-propanol, having a temperature of 90° C., were added 10 milliliters of boron trifluoride-diethyl ether. Ethylene oxide was then added from a cylinder into the reactor at a pressure between 1 and 5 p.s.i. over a period of approximately 7 hours during which time the temperature of the reaction never exceeded 130° C. An oxyalkylated product containing 2-methyl-2-nitro-4-oxa-6-hydroxy hexane was thereby produced.

15 grams of calcium hydroxide were then added to the reaction mixture and the mixture was thoroughly agitated. Three liters of methanol were then added to the mixture to form a slurry and the slurry was filtered. To the filtrate were then added 100 grams of Raney nickel and the thus-treated filtrate was hydrogenated at a pressure of approximately 400 to 500 p.s.i. at an initial temperature of 25° C. As the reduction proceeded, the temperature was gradually increased to approximately 50° C. The hydrogenation required a period of about 2 hours, during which time the reaction mixture was constantly agitated. After absorption of hydrogen had ceased, the reaction mixture was withdrawn from the container, the catalyst removed from the solution by filtration and the methanol separated from the reaction mixture by means of fractional distillation. The residue thus obtained was subjected to fractional distillation under vacuum. 2-methyl-6-hydroxy-4-oxa-2-hexylamine in the amount of 100 grams was collected.

The following data was determined for the compounds:
Found: N, 10.51%; H, 11.18%; C, 53.45%. Calculated: N,10.5%; H, 11.3%; C, 54.1%.

*Example II*

One mole of 2-nitro-2-methyl-1-propanol is reacted with two moles of 1,2-epoxyethylbenzene in accordance with the general procedure of Example I to produce 2-methyl-2-nitro-4,7-dioxa-6,9-diphenyl-9-hydroxy nonane. This nitro compound is reduced as in Example I to obtain 2-methyl-9-hydroxy-4,7-dioxa-6,9-diphenyl-2-nonylamine.

*Example III*

One mole of 2-nitro-2-methyl-1-propanol is reacted with one mole of 1,2-epoxyoctylbenzene in accordance with the general procedure of Example I to produce 2-methyl-2-nitro-4-oxa-6-hexylphenyl - 6 - hydroxy hexane. This nitro compound is reduced as in Example I to obtain 2-methyl-6-hydroxy-4-oxa-6-hexylphenyl - 2 - hexylamine.

*Example IV*

One mole of 2-nitro-2-methyl-1-propanol is reacted with two moles of 1,2-epoxyheptadecane in accordance with the general procedure of Example I to produce 2-methyl-2-nitro-4,7-dioxa - 6,9 - dipentadecyl - 9 - hydroxy nonane. This nitro compound is reduced as in Example I to obtain 2-methyl-9-hydroxy-4,7-dioxa-6,9-diphentadecyl-2-nonylamine.

*Example V*

One mole of 2-nitro-2-methyl-1-propanol is reacted with one mole of chloropropylene oxide in accordance with the general procedure of Example I to produce 2-methyl-2-nitro-6-hydroxy-4-oxa-6-chlromethyl-6-hexyl alcohol. This nitro compound is reduced as in Example I to obtain 2-methyl-6-hydroxy-4-oxa-6-chloromethyl-2-hexylamine.

*Example VI*

One mole of 2-nitro-2-methyl-1-propanol is reacted with two moles of 1,2-epoxyheptadecylbenzene in accordance with the general procedure of Example I to produce 2-methyl-2-nitro-4,7-dioxa-6,9-di(phenyl pentadecyl)-9-hydroxy nonane. This nitro compound is reduced as in Example I to obtain 2-methyl-9-hydroxy-4,7-dioxa-6,9-di(phenyl pentadecyl)-2-nonylamine.

*Example VII*

Two moles of 2-nitro-2-methyl-1-propanol is reacted with one mole of butadiene dioxide in accordance with the general procedure of Example I to produce 2,11-dimethyl-2,11-dinitro-4,9-dioxa-6,7-dihydroxy dodecane. This nitro compound is reduced as in Example I to obtain 2,11-dimethyl-6,7-dihydroxy-4,9-dioxa-2,11-dodecanediamine.

*Example VIII*

One mole of 2-nitro-2-methyl-1-propanol is reacted with one mole of 1,2-epoxyethyl nitrobenzene in accordance with the general procedure of Example I to produce 2-methyl-2-nitro-4-oxa-6-nitrophenyl-6-hydroxy hexane. This nitro compound is reduced as in Example I to obtain 2-methyl-6-hydroxy-4-oxa-6-nitrophenyl-2-hexylamine.

*Example IX*

One mole of 2-nitro-2-methyl-1-propanol is reacted with two moles of propylene oxide in accordance with the general procedure of Example I to produce 2-methyl-2-nitro-4,7-dioxa-6,9-dimethyl-9-hydroxy nonane. This nitro compound is reduced as in Example I to obtain 2-methyl-9-hydroxy-4,7-dioxa-6,9-dimethyl-2-nonylamine.

*Example X*

One mole of 3-methyl-3-nitro-2-butanol is reacted with one mole of ethylene oxide in accordance with the general procedure of Example I to produce 2,3-dimethyl-2-nitro-4-oxa-6-hydroxyhexane. This nitro compound is reduced as in Example I to obtain 2,3-dimethyl-6-hydroxy-4-oxa-2-hexylamine.

*Example XI*

One mole of 2-nitro-2-methyl-1-hexanol is reacted with one mole of ethylene oxide in accordance with the general procedure of Example I to produce 5-methyl-5-nitro-3-oxa-1-nonyl alcohol. This nitro compound is reduced as in Example I to obtain 5-amino-5-methyl-3-oxa-1-nonyl alcohol.

*Example XII*

One mole of 2-nitro-2-methyl-1-nonadecanol is reacted with one mole of ethylene oxide in accordance with the general procedure of Example I to produce 18-methyl-18-nitro-20-oxa-22-hydroxy docosane. This nitro compound is reduced as in Example I to obtain 18-methyl-22-hydroxy-20-oxa-18-docosylamine.

*Example XIII*

One mole of 12-nitro-12-methyl-1-tridecanol is reacted with one mole of ethylene oxide in accordance with the general procedure of Example I to produce 2-methyl-2-nitro-14-oxa-16-hydroxy hexadecane. The nitro compound is then reduced as in Example I to obtain 2-methyl-14-oxa-16-hydroxy-2-hexadecylamine.

*Example XIV*

One mole of 6-nitro-6-ethyl-1-heptanol is reacted with one mole of ethylene oxide as in Example I to produce 2-ethyl-2-nitro-8-oxa-10-hydroxy decane. This nitro compound is reduced as in Example I to obtain 2-ethyl-10-hydroxy-8-oxa-2-decylamine.

*Example XV*

One mole of 2-nitro-2-methyl-1-propanol is reacted with 16 moles of ethylene oxide to produce 2-methyl-2-nitro-4,7,10,13,16,19,22,25,28,31,34,37,40,43,46,49-hexadeca-oxa-51-hydroxy-dopentacontane. This compound is reduced as in Example I to obtain 2-methyl-51-hydroxy-4,7,10,13,16,19,22,25,28,31,34,37,40,43,46,49-hexadeca-oxa-2-dopentacontanylamine.

*Example XVI*

One mole of tris(hydroxymethyl)nitromethane is reacted with three moles of ethylene oxide in accordance with the general procedure of Example I to produce tris(2-hydroxyethoxy-methyl)nitromethane. The compound is reduced as in Example I to obtain tris(2-hydroxyethoxy-methyl)methylamine.

*Example XVII*

One mole of tris(hydroxyethyl)nitromethane and three moles of ethylene oxide are reacted following the procedure of Example I to give tris(2-hydroxyethoxy-ethyl)nitromethane. The compound is reduced as in Example I to obtain tris(2-hydroxyethoxy-ethyl)methylamine.

*Example XVIII*

Reaction of one mole of tris(hydroxyethyl)nitromethane with 2 moles of ethylene oxide following the procedure of Example I provides di(2-hydroxyethoxy ethyl) hydroxyethyl nitromethane. Reduction of this compound as in Example I provides the corresponding amine.

*Example XIX*

One mole of 2-nitro-2-methyl-1-propanol is reacted with one mole of 1,2-epoxyethyl-p-chlorobenzene in accordance with the procedure of Example I to produce 2-methyl-2-nitro-4-oxa-6-p-chlorophenyl-6-hydroxy hexane. This nitro compound is reduced as in Example I to obtain 2-methyl-6-hydroxy-4-oxa-6-p-chlorophenyl-2-hexylamine.

*Example XX*

One mole of 2-nitro-2-methyl-1-propanol is reacted with one mole of butadiene monoxide in accordance with the procedure set forth in Example I to produce 2-nitro-2-methyl-4-oxa-6-hydroxy-6-vinyl hexane. This nitro compound is reduced as in Example I to provide 2-methyl-4-oxa-6-hydroxy-6-vinyl-2-hexylamine.

*Example XXI*

One mole of 2-nitro-2-methyl-1-propanol is reacted with one mole of styrene oxide using 1.2 percent of p-xylenesulfonic acid as catalyst instead of the boron trifluoride to produce 2-nitro-2-methyl-4-oxa-6-phenyl-6-hydroxy hexane which is reduced as in Example I to provide 2-methyl-4-oxa-6-phenyl-6-hydroxy hexylamine.

*Example XXII*

One mole of 2-nitro-2-methyl-1-propanol is reacted with one mole of 3,4-epoxy-1-butanol in accordance with the procedure of Example I to produce 2-nitro-2-methyl-4-oxa-6-hydroxy-6-hydroxyethyl hexane which is reduced as in Example I to provide 2-methyl-4-oxa-6-hydroxy-6-hydroxyethyl-2-hexylamine.

Generically, the novel compounds of the present invention can be represented by the formula $$R_1-\underset{\underset{Z}{|}}{\overset{\overset{R_1}{|}}{C}}-(CHR_4)_x-R_2$$

wherein $R_4$ is a member selected from the group consisting of methyl and hydrogen; wherein $R_1$ is a member selected from the group consisting of alkyl radicals of about 1 to 20 carbon atoms; lower hydroxyalkyl radicals; and a radical having the general formula:

$$-(CH_2)_x-R_2$$

$R_2$ is a member selected from the group consisting of the radicals:

$$[O-CH_2-\underset{\underset{R_3}{|}}{CH}-]_yOH$$

and $$-O-CH_2-\underset{\underset{OH}{|}}{CH}-\underset{\underset{OH}{|}}{CH}-CH_2-O-CH_2-\underset{\underset{NO_2}{|}}{\overset{\overset{R_1}{|}}{C}}-R_1$$

wherein $R_3$ is a member selected from the group consisting of hydrogen, phenyl, nitro-substituted phenyl, halo-substituted phenyl, alkyl, hydroxy-substituted alkyl, halo-substituted alkyl, alkene, and phenyl-substituted alkyl radicals; $y$ is an integer ranging from 1 to 20; $x$ is an integer ranging from 1 to 20; and Z is selected from the group consisting of $NO_2$ and $NH_2$.

It is claimed:
1. A composition of matter having the general formula:

$$R_1-\underset{\underset{NO_2}{|}}{\overset{\overset{R_1}{|}}{C}}-(CH_2)_x-[O-CH_2-\underset{\underset{R_3}{|}}{CH}]_yOH$$

wherein $R_1$ is an alkyl radical of about 1 to 20 carbon atoms; $R_3$ is a member selected from the group consisting of hydrogen, alkyl and hydroxy-substituted alkyl; $y$ is an integer ranging from 1 to 20; and $x$ is an integer ranging from 1 to 20.

2. The compound 2-methyl-2-nitro-4-oxa-6-hydroxy-hexane.

References Cited by the Examiner

UNITED STATES PATENTS

| | | | |
|---|---|---|---|
| 2,067,385 | 1/1937 | Evans et al. | |
| 2,282,646 | 5/1942 | De Groote et al. | 260—584 |
| 2,483,739 | 10/1949 | Roach et al. | 260—615 |
| 2,491,533 | 12/1949 | Swern | 260—615 |
| 2,668,805 | 2/1954 | Greenlee. | |
| 2,798,873 | 7/1957 | Matter et al. | 260—584 X |
| 2,871,266 | 1/1959 | Riley | 260—584 |
| 3,021,341 | 2/1962 | Croxall et al. | 260—615 X |

JOSEPH R. LIBERMAN, *Primary Examiner.*

CHARLES B. PARKER, LORRAINE A. WEINBERGER, *Examiners.*

R. V. HINES, H. T. MARS, *Assistant Examiners.*